(12) United States Patent
Pegg

(10) Patent No.: US 9,086,147 B2
(45) Date of Patent: Jul. 21, 2015

(54) PISTON FOR AN ENGINE

(75) Inventor: Ian Graham Pegg, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 1060 days.

(21) Appl. No.: 12/844,216

(22) Filed: Jul. 27, 2010

(65) Prior Publication Data
US 2011/0023706 A1 Feb. 3, 2011

(30) Foreign Application Priority Data

Jul. 28, 2009 (GB) .................................. 0913089.9

(51) Int. Cl.
*F02F 3/02* (2006.01)
*F16J 1/09* (2006.01)

(52) U.S. Cl.
CPC ... *F16J 1/09* (2013.01); *F02F 3/027* (2013.01)

(58) Field of Classification Search
CPC .................. F16J 1/09; F02F 3/22; F02F 3/27
USPC ..................... 92/159, 177, 233, 158
See application file for complete search history.

(56) References Cited

U.S. PATENT DOCUMENTS

| 1,528,817 | A | | 3/1925 | Dinnes |
| 5,261,321 | A | * | 11/1993 | Whitacre .......................... 92/177 |
| 7,171,936 | B2 | * | 2/2007 | Rein et al. .................. 123/193.4 |
| 7,287,459 | B2 | * | 10/2007 | Tabata et al. ..................... 92/159 |

FOREIGN PATENT DOCUMENTS

| FR | 1537455 A | 8/1968 |
| GB | 142973 A | 5/1920 |
| GB | 200947 A | 7/1923 |
| GB | 246941 A | 2/1926 |

OTHER PUBLICATIONS

Great Britain Search Report dated Nov. 12, 2009, pp. 1.

* cited by examiner

*Primary Examiner* — Charles Freay
*Assistant Examiner* — Philip Stimpert
(74) *Attorney, Agent, or Firm* — Julia Voutyras; Alleman Hall McCoy Russell & Tuttle LLP

(57) ABSTRACT

A piston 10 for an engine has a number of elongate pockets 21, 22, 23, 24 each of which is arranged at an angle relative to a longitudinal axis HP2 of a contact zone 15 on the thrust and anti-thrust sides of the piston 10. The pockets 21, 22, 23, 24 are arranged in two columns C1, C2 one on each longitudinal side of a central portion 20 of the contact zone 15 to form partial barriers to reduce the loss of oil from the central portion 20 during use of the piston 10. The pockets 21, 22, 23, 24 are oriented differently above and below a transverse axis HP1 of the contact zone 15 so as to reduce the loss of oil irrespective of the direction of motion of the piston 10.

20 Claims, 4 Drawing Sheets

PISTON FOR AN ENGINE

CROSS-REFERENCE TO RELATED APPLICATIONS

This application claims foreign priority benefits under 35 U.S.C. §119(a)-(d) to GB 0913089.9 filed Jul. 28, 2009, which is hereby incorporated by reference in its entirety.

BACKGROUND

1. Technical Field

This disclosure relates to a piston for a reciprocating piston internal combustion engine and in particular to improving the lubrication of such a piston.

2. Background Art

It is known, for example in GB 2,448,544 A, to provide a piston with a number of pockets to retain oil in the areas of the piston subject to frictional contact with a cylinder wall. Even further improvements are desired.

SUMMARY

According to the disclosure there is provided a piston for use in a cylinder of an internal combustion engine, the piston having a crown portion extending away from a top end of the piston, an oval barrelled skirt depending from the crown so as to define a bottom end of the piston and a contact zone on the thrust and anti-thrust sides of the skirt. Each contact zone has a respective central portion bounded on each longitudinal side by a column of spaced apart elongate pockets, each of the elongate pockets has a longitudinal axis arranged at an angle with respect to a longitudinal axis of the respective contact zone so as to reduce the flow of oil from the central portion of the respective contact zone in a circumferential direction during use of the piston.

This has the advantage that more oil is retained in the central portion of each central zone thereby reducing friction and wear of the piston.

A transverse axis of the contact zone may divide each column into a pair of upper groups and a pair of lower groups and the pockets located in the upper groups may be oriented to reduce the flow of oil from the central zone during upward motion of the piston.

The pockets in the upper groups may be arranged in a herringbone pattern directed towards the transverse axis.

Each of the pockets in the upper groups may have an inner end and an outer end. The inner end of each pocket may be located further from the top end of the piston than the outer end of each pocket. Each of the pockets in the upper groups has the inner end located nearer to the longitudinal axis of the contact zone than the outer end.

A transverse axis of the contact zone may divide each column into a pair of upper groups and a pair of lower groups and the pockets located in the lower groups may be oriented so as to reduce the flow of oil from the central zone during downward motion of the piston.

The pockets in the lower groups may be arranged in a herringbone pattern directed towards the transverse axis.

Each of the pockets in the lower groups may have an inner end and an outer end and the inner end of each pocket may be located nearer to the top end of the piston than the outer end.

Each of the pockets in the lower groups may have an inner end and an outer end and each of the pockets in the lower groups may have the inner end located nearer to the longitudinal axis of the contact zone than the outer end.

The pockets may be oriented so as to encourage the flow of oil into the central portion of the respective contact zone during use of the piston. This has the advantage that oil is actively encouraged to remain in the central portion of each contact zone.

The longitudinal axis of the contact zone may be arranged coincident with a line joining high points on the surface of the skirt due to the oval shape of the piston.

The transverse axis of the contact zone may be arranged coincident with a line joining high points on the surface of the skirt due to the barrel shape of the piston.

Each of the two contact zones may have a coating formed thereon and the pockets may be formed in the coating.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations.

With reference to the figures, a piston 10 has a crown portion 11 at a top end thereof and a skirt 13 depending from the crown portion 11 defining a bottom of the piston 10. The crown portion 11 as is well known in the art has a number of circumferentially extending grooves in which are located piston rings 12.

Figure 1:
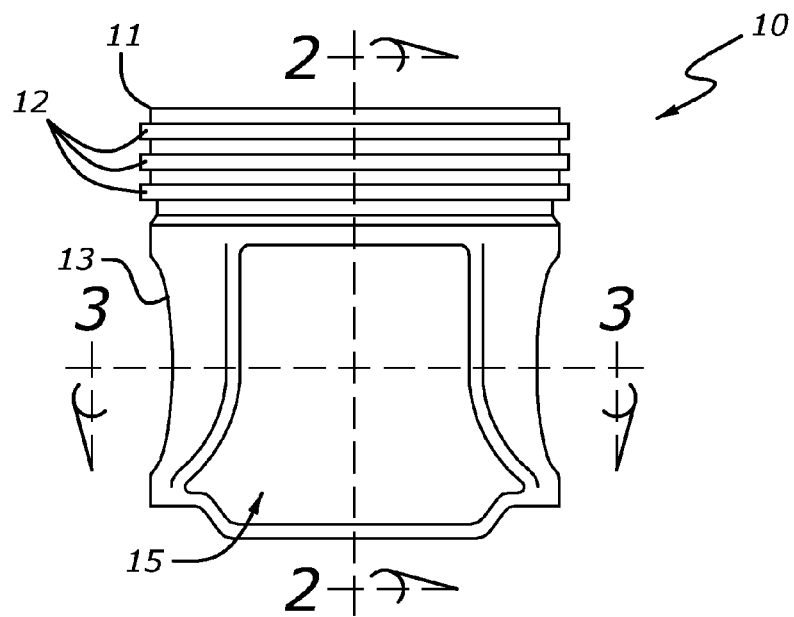
FIG. 1 is a front view of a piston for an engine showing a contact zone on one of a thrust side and an anti-thrust side of a skirt of the piston.
Figure 2:
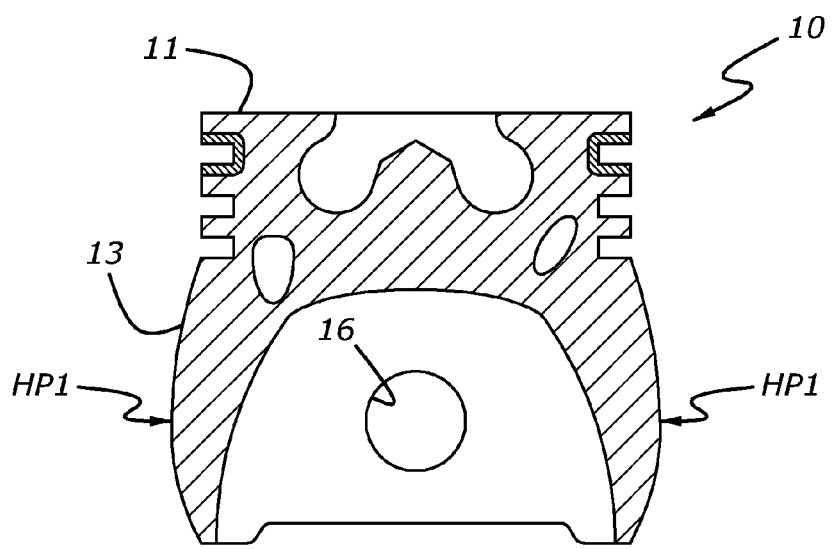
FIG. 2 is a cross-section on the line 2-2 on FIG. 1.
Figure 3:
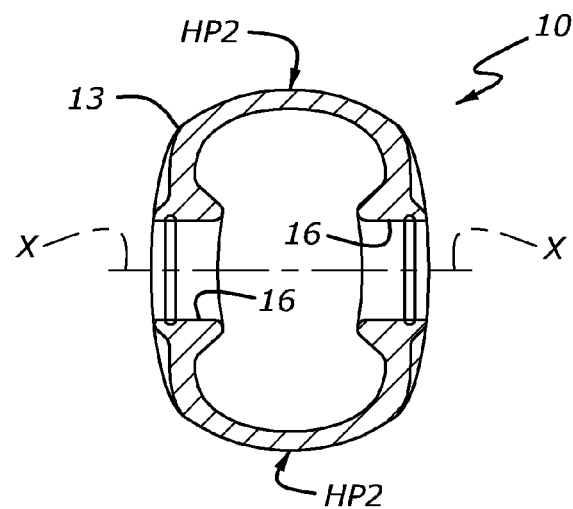
FIG. 3 is a cross section on the line 3-3 on FIG. 1.
Figure 4:
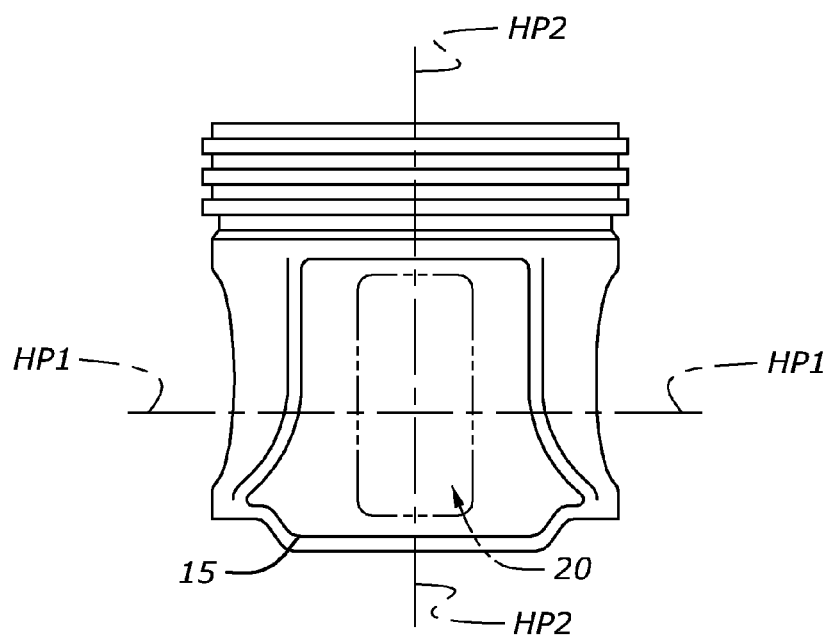
FIG. 4 is a view similar to FIG. 1 but showing a central portion of the contact zone.

The skirt 13 is oval in transverse cross-section as shown in FIG. 3 and is barrel shaped in longitudinal cross-section as shown in FIG. 2.

The skirt 13 defines two apertures 16 which are used to support a gudgeon pin (not shown) for pivotally connecting the piston 10 to a connecting rod (not shown). The gudgeon pin (or wrist pin) connects the piston 10 to the connecting rod so that it can rock or rotate about a transverse axis X-X.

The piston 10 has two diametrically opposition contact zones on the thrust and anti-thrust sides of the skirt 13 (of which only the contact zone 15 on the thrust side of the piston 10 is shown on the Figures) that are coated with a low friction abrasion resistive coating by, for example, screen printing. Although the terms thrust and anti-thrust are well known in the art, a description of these terms can be found in U.S. Pat. No. 6,345,569.

Each contact zone 15 includes a central portion 20 where contact between the skirt 13 and a cylinder wall of an engine to which the piston 10 is fitted is likely to occur. It is desirable to ensure that lubrication of these central portions 20 occurs without supplying large quantities of oil to reduce friction, i.e., without increasing oil pumping losses.

The barrelling of the piston 10 is approximately centered on the transverse axis X-X since it is this axis about which the piston 10 rocks when reciprocating in a cylinder of the engine. The barrelling results in the skirt 13 and the cylinder wall no longer being parallel to one another and, during reciprocation, the piston 10 rocks about the axis X-X which combined with the barrelled shape of the skirt 13 causes the trapped volume between the cylinder wall and the skirt 13 to converge towards the fullest part of the barrelling irrespective of the direction in which the piston 10 is travelling. The relative movement of oil within these converging volumes generates a hydrodynamic oil bearing which reduces friction and wear between the piston 10 and the cylinder wall.

The fullest part of the barrelling results in a first set of high points that fall on a line that extends in a circumferential direction around part of the skirt 13 and a transverse axis HP1 of each contact zone 15 is arranged coincident with the line joining the high points on the surface of the skirt 13 so as to divide each contact zone 15 into upper and lower parts.

The oval shape of the skirt 13 also produces on the thrust side of the skirt 13 a number of high points that fall on a line that extends longitudinally along that side of the skirt 13 through the respective contact zone so as to divide the respective contact zone 15 into a left hand side part and a right hand side part and a longitudinal axis HP2 of the central portion 20 is arranged coincident with the line joining the high points on the surface of the skirt 13. Similarly, the oval shape of the skirt 13 also produces on the anti-thrust side of the skirt 13 a number of high points that fall on a line that extends longitudinally along that side of the skirt 13 through the respective contact zone so as to divide the contact zone into a left hand side part and a right hand side part and a longitudinal axis HP2 of the central portion is arranged coincident with the line joining the high points on the surface of the skirt 13

In use, oil located in the left hand side part of each contact zone 15 will tend to flow to the left away from the longitudinal high point HP2 and similarly, oil located in the right hand side part of each contact zone 15 will tend to flow to the right away from the longitudinal high point HP2.

Figure 5:
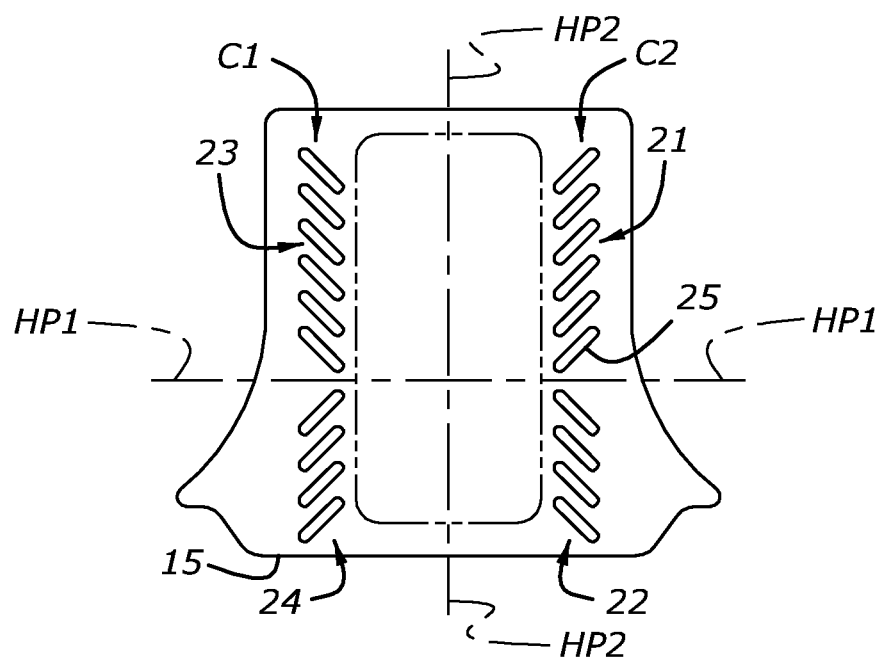
FIG. 5 is an enlarged, not-to-scale view of the contact zone shown in FIG. 4, showing the location and orientation of oil retention pockets according to an embodiment of the disclosure.
Figure 6A:
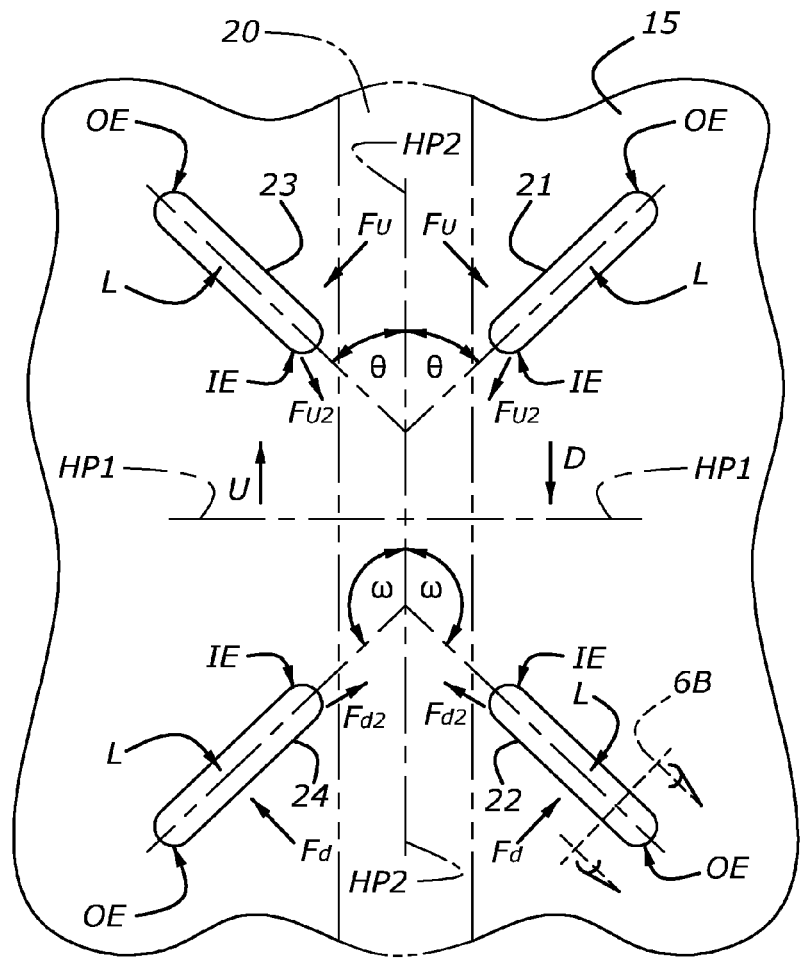
FIG. 6A is an enlarged view of part of the contact zone shown in FIG. 5 showing in greater detail four of the oil retention pockets.
Figure 6B:
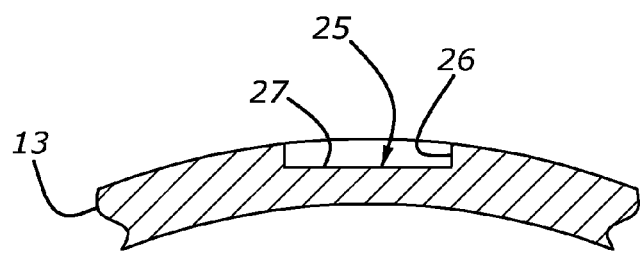
FIG. 6B is a cross-section on the line 6-6 on FIG. 6A.

With particular reference to FIGS. 5 to 6B it can be seen that the contact zone 15 has a number of elongate pockets 25 formed therein. The pockets 25 may be formed as part of the screen printing process used to apply the friction coating to the contact zone or may be produced by laser etching or by any other practical method. The size of the pockets 25 will depend on the specific application and size of piston 10 but for a 90 mm diameter piston each pocket 25 may typically be 3 mm long, approximately 0.1 mm wide, and 0.02 mm deep. The surrounding coating may have a surface finish (Rz) in the range of 5 to 10 microns. It is desirable to keep the central portion 20 of the contact zone free of all pockets 25 as these would disturb the hydrodynamic lubrication and potentially increase frictional losses.

The central portion 20 of each contact zone 15 is bounded on each longitudinal side by a column C1, C2 formed of spaced apart elongate pockets 25, each of the pockets having a longitudinal axis 'L' arranged at an angle ($\theta$, $\omega$) with respect to the longitudinal axis HP2 of the central portion 15 so as to reduce the flow of oil from the central portion 20 of the contact zone 15 in a circumferential direction during use of the piston 10. Each pocket 25, of which one is shown in cross-section in FIG. 6B, has a peripheral wall 26 and a closed base 27 and may, as shown, be of uniform depth or could vary in depth either along its length or across its width or both.

The transverse axis HP1 of the contact zone 15 divides each column C1, C2 into an upper and a lower group.

The pockets 25 located in the upper groups are hereinafter given the reference numerals 21, 23 and are oriented at an acute angle $\theta$ to the longitudinal axis HP2 to reduce the flow of oil from the central zone 20 during upward motion (see arrow U on FIG. 6A) of the piston 10.

The pockets 25 located in the lower groups are hereinafter given the reference numerals 22, 24 and are oriented at an oblique angle $\omega$ to the longitudinal axis HP2 so as to reduce the flow of oil from the central zone 20 during downward motion (see arrow D on FIG. 6A) of the piston 10.

The pockets 21, 23 in the upper groups form a herringbone pattern directed towards the transverse axis HP1 and the pockets 22, 24 in the lower groups form a herringbone pattern directed towards the transverse axis HP1.

Each of the pockets 21, 23 in the upper groups has an inner end, IE, and an outer end, OE, and the inner end, IE, of each pocket 21, 23 is located nearer to the transverse axis HP1 than the outer end, OE, of each pocket 21, 23, that is to say, the inner end, IE, is further from the top of the piston 10 than the outer end, OE, and the inner end, IE, of each aperture 21, 23 is located nearer to the longitudinal axis HP2 of the central portion 20 than the outer end, OE. Therefore, when the piston 10 moves in an upward direction 'U' oil will be encouraged to flow in each of the pockets 21, 23 from their outer ends, OE, to their inner ends, IE, due to the orientation of the pockets 21, 23 and the pressure variations that will naturally occur within each pocket 21, 23. The pockets 21, 23 in the two upper groups, therefore, encourage the flow of oil into the central portion 20 of the contact zone 15 during use of the piston 10 and will tend to pump oil both towards the longitudinal axis HP2 and also towards the transverse axis HP1 thereby reducing the loss of oil from the central portion 20. It will however, be appreciated that some oil will still be able to escape from the central region 20 towards the piston crown 11 and circumferentially around the skirt 13 away from the longitudinal axis HP2 but these losses are reduced by the presence of the pockets 21, 23 and their pumping action.

Each of the pockets 22, 24 in the lower groups has an inner end, IE, and an outer end, OE, and the inner end, IE, of each pocket 22, 24 is located nearer to the transverse axis HP1 and to the top of the piston 10 than the outer end OE of each pocket 22, 24 and the inner end, IE, of each pocket 22, 24 is located nearer to the longitudinal axis HP2 of the central portion 20 than the outer end OE. Therefore when the piston 10 moves in a downward direction, 'D', oil will be encouraged to flow in each of the pockets 22, 24 from their outer ends, OE, to their inner ends, IE, due to the orientation of the pockets 22, 24 and the pressure variations that will naturally occur within each pocket 22, 24. The pockets 22, 24 in the two lower groups will therefore encourage the flow of oil into the central portion 20 of the contact zone 15 during use of the piston 10 and will tend to pump oil both towards the longitudinal axis HP2 and also towards the transverse axis HP1 thereby reducing the loss of oil from the central portion 20. It will however, be appreciated that some oil will still be able to escape from the central region 20 towards the bottom of the skirt 13 and circumferentially around the skirt 13 away from the longitudinal axis HP2 but these losses are reduced by the pumping action of the pockets 22, 24.

All of the pockets 21, 22, 23, 24 are, therefore, oriented so as to encourage the flow of oil into the central portion 20 of the contact zone 15 during use of the piston 10.

In use, when the piston 10 moves in the downward direction 'D', hydrodynamic pressure will build up below the transverse axis HP1 and will peak at or close to the transverse axis HP1. The pressure will drop very rapidly to the upper side of the transverse axis HP1 and so the pockets 21, 23 in the two upper groups have little or no effect during downward motion of the piston 10. However, due to the high pressure below the transverse axis HP1, the pockets 22, 24 are active in reducing the loss of pressure from the central portion 20 in a circumferential direction. As shown in FIG. 6A, when the piston 10 moves in the downward direction 'D', the oil flows in the direction $F_d$ relative to the skirt 13 into the pockets 22, 24 and then along the pockets 22, 24 to the inner end IE of each pocket 22, 24 where it emerges as a flow $F_{d2}$ directed towards the transverse and longitudinal axes HP1 and HP2 thereby returning some oil that would otherwise have been lost to the central portion 20 in a pump like action.

Similarly, when the piston 10 is moving in the upward direction 'U', hydrodynamic pressure will build up above the transverse axis HP1 and will peak at or close to the transverse axis HP1. The pressure will drop very rapidly to the lower side of the transverse axis HP1 and so the pockets 22, 24 in the two lower groups have little or no effect during upward motion of the piston 10. However, due to the high pressure above the transverse axis HP1 the pockets 21, 23 are active in reducing the loss of pressure from the central portion 20 in a circumferential direction. As shown in FIG. 6A, when the piston 10 moves in the upward direction 'U', the oil flows in the direction $F_U$ relative to the skirt 13 into the pockets 21, 23 and then along the pockets 21, 23 to the inner end IE of each pocket 21, 23 where it emerges as a flow $F_{U2}$ directed towards the transverse and longitudinal axes HP1 and HP2 thereby returning some oil that would otherwise have been lost to the central portion 20 in a pump like action.

Therefore in summary, the disclosure provides a low cost way to reduce friction and hence fuel consumption by adding pockets in strategic locations on the skirt that promote the retention of an oil film. The pockets form a partial barrier between an area of high oil pressure and a surrounding area of lower oil pressure and act so as to reduce the loss of oil from the high pressure area during use of the piston.

It will be appreciated by those skilled in the art that although the disclosure has been described by way of example with reference to one or more embodiments it is not limited to the disclosed embodiments and that one or more modifications to the disclosed embodiments or alternative embodiments could be constructed without departing from the scope of the disclosure as set out in the appended claims.

While the best mode has been described in detail, those familiar with the art will recognize various alternative designs and embodiments within the scope of the following claims. Where one or more embodiments have been described as providing advantages or being preferred over other embodiments and/or over background art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. The embodiments described as being less desirable relative to other embodiments with respect to one or more characteristics are not outside the scope of the disclosure as claimed.

What is claimed:

1. A piston for use in a cylinder of an internal combustion engine, the piston having a crown portion extending away from a top end of the piston, an oval barrelled skirt depending from the crown so as to define a bottom end of the piston and a contact zone on a thrust side of the barrelled skirt and a contact zone on an anti-thrust side of the barrelled skirt wherein:

the contact zone on the thrust side has a longitudinal axis bounded on a first side by a column of spaced apart closed ended elongate pockets and bounded on a second side by a column of spaced apart closed ended elongate pockets, a central portion of the contact zone free of closed ended elongated pockets and extending a length of the columns of spaced apart closed ended elongate pockets; and the spaced apart closed ended elongate pockets in the column on the first side having longitudinal axes arranged at an acute angle θ with respect to the longitudinal axis of the contact zone on the thrust side, the spaced apart closed ended elongate pockets in the column on the second side having longitudinal axes arranged at the acute angle θ with respect to the longitudinal axis of the contact zone on the thrust side, the acute angle θ being less than 90 degrees and positive for the spaced apart closed ended elongate pockets in the column on the first side of spaced apart closed ended elongate pockets, the acute angle θ being negative for the spaced apart closed ended elongate pockets in the column on the second side.

2. The piston of claim 1 wherein a transverse axis of the contact zone divides the column of spaced apart closed ended elongate pockets on the first side and the column of spaced apart closed ended elongate pockets on the second side into a pair of upper groups and a pair of lower groups, wherein the spaced apart closed ended elongate pockets located in the pair of upper groups include ends nearest the bottom end of the piston being ends nearest the longitudinal axis of the contact zone on the thrust side, and wherein the spaced apart closed ended elongate pockets located in the pair of lower groups include ends nearest the top end of the piston being ends nearest the longitudinal axis of the contact zone on the thrust side.

3. The piston of claim 2 wherein the spaced apart closed ended elongate pockets in the pair of upper groups are arranged in a herringbone pattern directed towards the transverse axis.

4. The piston of claim 2 wherein each of the spaced apart closed ended elongate pockets in the pair of upper groups has an inner end and an outer end and the inner end of each spaced apart closed ended elongate pocket is located further from the top end of the piston than the outer end of each spaced apart closed ended elongate pocket.

5. The piston of claim 2 wherein each of the spaced apart closed ended elongate pockets in the pair of upper groups has an inner end and an outer end and each of the spaced apart closed ended elongate pockets in the pair of upper groups has the inner end located nearer to the longitudinal axis of the contact zone on the thrust side than the outer end.

6. The piston of claim 1 wherein a transverse axis of the contact zone on the thrust side divides each column into a pair of upper groups and a pair of lower groups and the spaced apart closed ended elongate pockets located in the pair of lower groups are oriented so as to reduce flow of oil from the central portion during downward motion of the piston.

7. The piston of claim 6 wherein the spaced apart closed ended elongate pockets in the pair of lower groups are arranged in a herringbone pattern directed towards the transverse axis.

8. The piston of claim 6 wherein each of the spaced apart closed ended elongate pockets in the pair of lower groups has an inner end and an outer end and the inner end of each spaced apart closed ended elongate pocket is located nearer to the top end of the piston than the outer end.

9. The piston of claim 6 wherein each of the spaced apart closed ended elongate pockets in the pair of lower groups has an inner end and an outer end and each of the spaced apart closed ended elongate pockets in the pair of lower groups has the inner end located nearer to the longitudinal axis of the contact zone on the thrust side than the outer end.

10. The piston of claim 1 wherein the spaced apart closed ended elongate pockets are oriented so as to encourage flow of oil into the central portion of the respective contact zone during use of the piston.

11. The piston of claim 1 wherein the longitudinal axis of the contact zone is arranged coincident with a line joining high points on a surface of the oval barreled skirt.

12. The piston of claim 2 wherein the transverse axis of the contact zone is arranged substantially coincident with a line joining high points on a surface of the oval barreled skirt.

13. The piston of claim 1 wherein the contact zone on the thrust side has a coating formed thereon and the spaced apart closed ended elongate pockets are formed in the coating.

14. A piston for use in a crank-slider arrangement, the piston having contact zones on thrust and anti-thrust sides of a skirt of the piston, comprising:
a column of a first group of closed ended elongate pockets on a first side of a contact zone on the thrust side of the skirt, the contact zone being free of closed ended elongate pockets and extending a length of the column, the column of the first group of closed ended elongate pockets including longitudinal axes, and a column of a second group of closed ended elongate pockets on a second side of the contact zone, the column of the second group of closed ended elongate pockets including longitudinal axes, wherein the longitudinal axes of the column of the first group of closed ended elongate pockets and the longitudinal axes of the column of the second group of closed ended elongate pockets are arranged at an oblique angle ω with respect to a longitudinal axis of the contact zone, and wherein the oblique angle ω is greater than 90 degrees and is positive with respect to the longitudinal axes of the column of the first group of closed ended elongate pockets and negative with respect to the longitudinal axes of the column of the second group of closed ended elongate pockets.

15. The piston of claim 14 wherein each contact zone has a transverse axis generally perpendicular with a longitudinal axis, with each closed ended elongate pocket located in one of an upper left zone, an upper right zone, a lower left zone, and a lower right zone.

16. The piston of claim 14 wherein each contact zone has a transverse axis generally perpendicular with a longitudinal axis with each closed ended elongate pocket located in one of an upper left zone, an upper right zone, a lower left zone, and a lower right zone wherein a first end of each closed ended elongate pocket is an end located closer to the transverse axis and a second end of each closed ended elongate pocket is located farther away from the longitudinal axis.

17. The piston of claim 16 wherein the longitudinal axis of the contact zone is arranged coincident with a line joining high points on a surface of the skirt due to an oval shape of the piston and the transverse axis of the contact zone is arranged substantially coincident with a line joining high points on the surface of the skirt due to a barrel shape of the piston.

18. The piston of claim 14 wherein the contact zone has a central portion arranged longitudinally and the first group of closed ended elongate pockets is arranged on one side of the central portion.

19. A piston for reciprocating a cylinder, the piston having a skirt and a contact zone on each of thrust and anti-thrust sides of the skirt comprising:
a column of closed ended elongate pockets arranged on a first side of a longitudinal axis of each contact zone and a column of closed ended elongate pockets arranged on a second side of the longitudinal axis of each contact zone, the closed ended elongate pockets on the first side including longitudinal axes arranged at an acute angle θ with respect to a longitudinal axis of each contact zone at a location above a transverse axis of the piston, the closed ended elongate pockets on the second side having longitudinal axes arranged at the acute angle θ with respect to a longitudinal axis of the contact zone at a location above the transverse axis of the piston, the acute angle θ less than 90 degrees, the acute angle θ being positive for the closed ended elongate pockets on the first side, and the acute angle θ being negative for the closed ended elongate pockets on the second side, where each contact zone includes a central portion absent closed ended elongate pockets, and where the contact zone extends a length of the columns of closed ended elongate pockets.

20. The piston of claim 19 wherein each contact zone has a respective central portion where the column of closed ended elongate pockets arranged on the first side of the longitudinal axis of the contact zone and the column of closed ended elongate pockets arranged on the second side of the longitudinal axis of the contact zone are located outside the central portion, further comprising the closed ended elongate pockets on the column on the first side including longitudinal axes arranged at an oblique angle w with respect to the longitudinal axis of the contact zone at a first location below the transverse axis of the piston and the closed ended elongate pockets on the column on the second side including longitudinal axes arranged at the oblique angle ω with respect to the longitudinal axis of the contact zone at a second location below the transverse axis of the piston, the oblique angle w being positive for the column on the first side and negative for the column on the second side.

* * * * *